US011654852B2

(12) United States Patent
Baldreus et al.

(10) Patent No.: US 11,654,852 B2
(45) Date of Patent: May 23, 2023

(54) SIDE AIRBAG MODULE AND VEHICLE SEAT

(71) Applicant: Autoliv Development AB, Vargarda (SE)

(72) Inventors: David Baldreus, Vårgårda (SE); Johan Fritzen, Vårgårda (SE); Oskar Callerud, Skövde (SE); Andreas Adolfsson, Floby (SE)

(73) Assignee: Autoliv Development AB, Vargarda (SE)

( * ) Notice: Subject to any disclaimer, the term of this patent is extended or adjusted under 35 U.S.C. 154(b) by 565 days.

(21) Appl. No.: 16/622,745

(22) PCT Filed: Jun. 1, 2018

(86) PCT No.: PCT/EP2018/064470
§ 371 (c)(1),
(2) Date: Dec. 13, 2019

(87) PCT Pub. No.: WO2018/228831
PCT Pub. Date: Dec. 20, 2018

(65) Prior Publication Data
US 2021/0138991 A1    May 13, 2021

(30) Foreign Application Priority Data

Jun. 14, 2017 (DE) .......................... 102017113105.1

(51) Int. Cl.
*B60R 21/207* (2006.01)
*B60R 21/231* (2011.01)

(52) U.S. Cl.
CPC ...... *B60R 21/207* (2013.01); *B60R 21/23138* (2013.01); *B60R 2021/23146* (2013.01)

(58) Field of Classification Search
CPC ............ B60R 21/207; B60R 21/23138; B60R 2021/23146; B60R 2021/0006
See application file for complete search history.

(56) References Cited

U.S. PATENT DOCUMENTS 5,628,527 A    5/1997  Olson et al.
5,967,603 A *  10/1999 Genders ................ B60R 21/207
                                                       280/730.2

(Continued)

FOREIGN PATENT DOCUMENTS

DE    102009044732 A1 *  2/2011  ............... B60N 2/42
DE    102015120594 A1     6/2016
(Continued)

OTHER PUBLICATIONS

JP-2014227004-A (machine translation) (Year: 2014).*
(Continued)

*Primary Examiner* — James M Dolak
*Assistant Examiner* — Joselynn Y Sliteris
(74) *Attorney, Agent, or Firm* — Harness, Dickey & Pierce, P.L.C.; Stephen T. Olson (57) ABSTRACT

A side airbag module for being attached to a seat frame (40) is described. Said airbag module has an inflator and at least one mounting stud (14) extending from said inflator. An airbag defining a gas space and being in fluid communication to said inflator is provided and is at least partially rolled and/or folded to an airbag package (20). The airbag package (20) is held by a wrapper (23) encircling at least a part of the airbag package (20). In order to simplify the mounting process of upholstery, at least one additional flexible flap (30) extends from the wrapper (23) and said additional flexible flap (30) has or carries at least one connection means for connecting the flexible flap to the frame (40) of a vehicle seat.

6 Claims, 6 Drawing Sheets

(56) References Cited

U.S. PATENT DOCUMENTS

| | | | |
|---|---|---|---|
| 7,637,529 B2* | 12/2009 | Tracht | B60R 21/207 297/216.12 |
| 7,669,888 B2 | 3/2010 | Sato et al. | |
| 7,753,407 B2* | 7/2010 | Yokota | B60R 21/20 280/730.2 |
| 7,971,900 B2* | 7/2011 | Lim | B60R 21/23138 280/730.2 |
| 7,992,894 B2* | 8/2011 | Lim | B60R 21/207 280/730.2 |
| 8,167,333 B2* | 5/2012 | Tracht | B60R 21/207 280/730.2 |
| 8,353,527 B2* | 1/2013 | Sugimoto | B60R 21/233 280/730.2 |
| 8,523,221 B2 | 9/2013 | Mueller | |
| 8,807,591 B2* | 8/2014 | Nakata | D05B 23/00 280/730.2 |
| 8,905,433 B2 | 12/2014 | Scott et al. | |
| 9,108,589 B2* | 8/2015 | Rickenbach | B60R 21/217 |
| 9,205,797 B2 | 12/2015 | Östman et al. | |
| 9,346,431 B1* | 5/2016 | Kim | B60R 21/207 |
| 9,517,746 B2 | 12/2016 | Scott et al. | |
| 9,533,648 B2 | 1/2017 | Fujiwara | |
| 9,598,040 B2* | 3/2017 | Tanabe | B60N 2/682 |
| 10,232,816 B2* | 3/2019 | Fujiwara | B60R 21/01 |
| 10,471,921 B2 | 11/2019 | Ydren et al. | |
| 10,668,887 B2* | 6/2020 | Fukawatase | B60R 21/233 |
| 2012/0038131 A1 | 2/2012 | Mueller et al. | |
| 2014/0138939 A1 | 5/2014 | Scott et al. | |
| 2015/0061265 A1 | 3/2015 | Scott et al. | |
| 2015/0123382 A1 | 5/2015 | Rickenbach et al. | |
| 2015/0367803 A1* | 12/2015 | Fujiwara | B60R 21/216 280/728.2 |
| 2016/0159306 A1 | 6/2016 | Fujiwara | |
| 2018/0148012 A1 | 5/2018 | Ydren et al. | |

FOREIGN PATENT DOCUMENTS

| | | | | |
|---|---|---|---|---|
| EP | 3085584 A1 | 10/2016 | | |
| FR | 2969976 A1 * | 7/2012 | | B60R 21/207 |
| GB | 2322338 A | 8/1998 | | |
| GB | 2508005 A | 5/2014 | | |
| JP | 2014227004 A * | 12/2014 | | |
| WO | WO2010003407 A1 | 1/2010 | | |
| WO | WO-2018105335 A1 * | 6/2018 | | B60R 21/207 |

OTHER PUBLICATIONS

WO-2018105335-A1 (machine translation) (Year: 2018).*
DE-102009044732-A1 (machine translation) (Year: 2011).*
FR-2969976-A1 (Year: 2012).*
International Search Report of the International Searching Authority for PCT/EP2018/064470 dated May 5, 2018.

* cited by examiner

SIDE AIRBAG MODULE AND VEHICLE SEAT

FIELD

Background

Side airbag modules are widely used in today's automotive technology and serve for the protection of the driver or a passenger during a side collision of the vehicle. A side airbag module always comprises an inflator and an airbag defining a gas space being in fluid communication to this inflator. In the stored stage the mayor part of the airbag is rolled and/or folded to an airbag package. In most cases the inflator of the inflator unit has the shape of an oblong cylinder and two mounting studs extend from the generating surface of this cylinder-shaped inflator. The inflator and the mounting studs define the inflator unit. Usually the cylinder-shaped inflator is completely or partially located inside the gas space and the mounting studs extend through respective holes in the airbag.

A side airbag module can be mounted to the side structure of the vehicle (especially its B-pillar), but most often the side airbag module is mounted to the frame of a vehicle seat. Here, the inflator and the airbag package are in most cases located on the outer side of the frame (pointing towards the side structure or the door of the vehicle), such that the inflator and the airbag package are located between a section of the frame and a section of the upholstery of the vehicle seat.

It is known to locate the complete airbag package inside a plastic housing, but in many modern concepts this plastic housing is replaced by a flexible wrapper made of foil or fabric, which encircles at least a part of this airbag package. Using such a wrapper instead of a plastic housing leads to a significant reduction in weight, size and production costs. A generic side airbag module using such a wrapper is for example known from generic U.S. Pat. No. 5,628,527.

Since the airbag has to deploy in a forward direction (towards the front of the vehicle) the airbag package is (also viewed in relation to the vehicle) located in front of the inflator unit. Because the upholstery is usually pulled over the sides of the frame (with one side of the frame carrying the side airbag module) in a direction from the front towards the rear, care must be taken to ensure that the airbag package keeps its desired position relative to the frame (meaning that it is not bent, partially bent or twisted). This complicates and slows down the mounting process of the vehicle seat unit.

SUMMARY

Starting from this it is the task of the invention to improve a side airbag module of the generic type in such a way that the assembly process of a vehicle seat comprising such a side airbag module is simplified while a reproducible position of the airbag package relative to the frame is guaranteed.

According to the invention at least one additional flexible flap extends from the wrapper. This additional flexible flap has or carries at least one connection means for connecting the flexible flap to the frame of a vehicle seat directly or indirectly. This additional flap is located at outside of the wrapper while the encircled part of the airbag package is located inside the wrapper.

Preferably the flexible flap is configured in such a way that the at least one connection means is adapted to be connected to the frame at a side of the frame opposite the side of the frame the airbag package is connected to. So, if the airbag package is on the outside of the frame (as is usually is) the additional flap attaches to the frame at the inside of the frame. As mentioned, the attachment means can be configured to attach directly to the frame or indirectly to the frame, for example via at least one mounting studs of the inflator unit.

Further preferably the wrapper-proximate end of the additional flap is attached to the wrapper near its front end and/or the additional flap extends over the front end of the wrapper, such that the front end of the wrapper and thus the front end of the airbag package cannot substantially move relative to the frame when the upholstery is pulled over the airbag module.

So, no special care must be taken when the upholstery is mounted to the vehicle frame.

The at least one connection means can especially comprise a hole in the additional flexible flap and/or a hook attached to the additional flexible flap.

Usually the wrapper shows a breaking line at its front end area. In one embodiment the additional flexible flap does not extend over the breaking line of the wrapper. This makes the production of the airbag module very simple. In another embodiment the additional flexible flap extends over the breaking line of the wrapper and shows an additional breaking line basically in front of the breaking line of the wrapper. This makes an even tighter positioning of the airbag package relative to the frame possible. In this case at least a section of the wrapper is located between the airbag package and the additional flap when the airbag module is mounted to the frame of the vehicle seat.

BRIEF DESCRIPTION OF THE DRAWINGS

The invention will now be described by means of preferred embodiments in view of the drawings. The figures show:

FIG. 1 a schematic cross sectional view (along a basically horizontal plane) of a first embodiment of a side airbag module according to the invention, FIG. 2 the side airbag module of FIG. 1 in a side view from the direction A in FIG. 1, FIG. 3 the side airbag module of FIG. 1 being mounted to a frame of a vehicle seat in a representation according to FIG. 1, FIG. 3a the detail B of FIG. 3 in a side elevation from direction B, FIG. 4 what is shown in FIG. 3 after the additional flexible flap of the side airbag module has been connected to the mounting studs of the inflator and directly to the frame, FIG. 5 what is shown in FIG. 4 after the upholstery has been mounted to the frame basically by pulling the same in direction R over the frame, FIG. 6 a second embodiment of the invention in a representation according to FIG. 1, FIG. 7 what is shown in FIG. 6 in a representation according to FIG. 2, FIG. 8 the airbag module of FIG. 6 being mounted to the frame of a vehicle seat with the upholstery being mounted to the frame (according to FIG. 5), FIG. 9 a third embodiment of the invention in a representation according to FIGS. 1 and 6, FIG. 10 the airbag module of FIG. 9 being mounted to the frame of the vehicle seat, FIG. 11 An airbag module according to the prior art in the representation according to FIG. 1, FIG. 12 what is shown in FIG. 11 in a representation according to FIGS. 2 and 7, FIG. 13 the airbag module of FIG. 11 being mounted to the frame of a vehicle seat and FIG. 14 what is shown in FIG. 13 after the upholstery has been mounted to the frame of the vehicle.

First, a side airbag module of the prior art and a vehicle seat comprising such a side airbag module are described in view of FIGS. 11 to 14. It is believed that this helps to better understand the invention.

DETAILED DESCRIPTION

Figure 11:
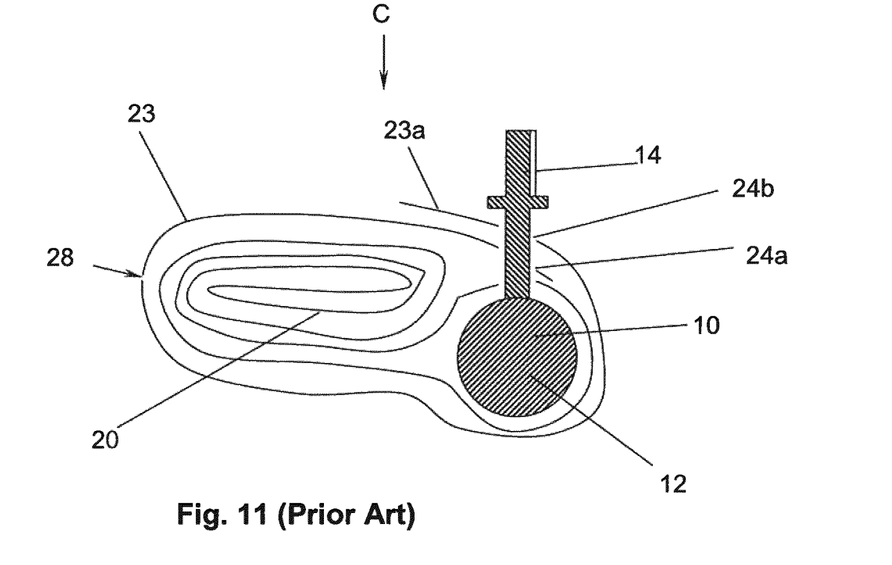
Figure 12:
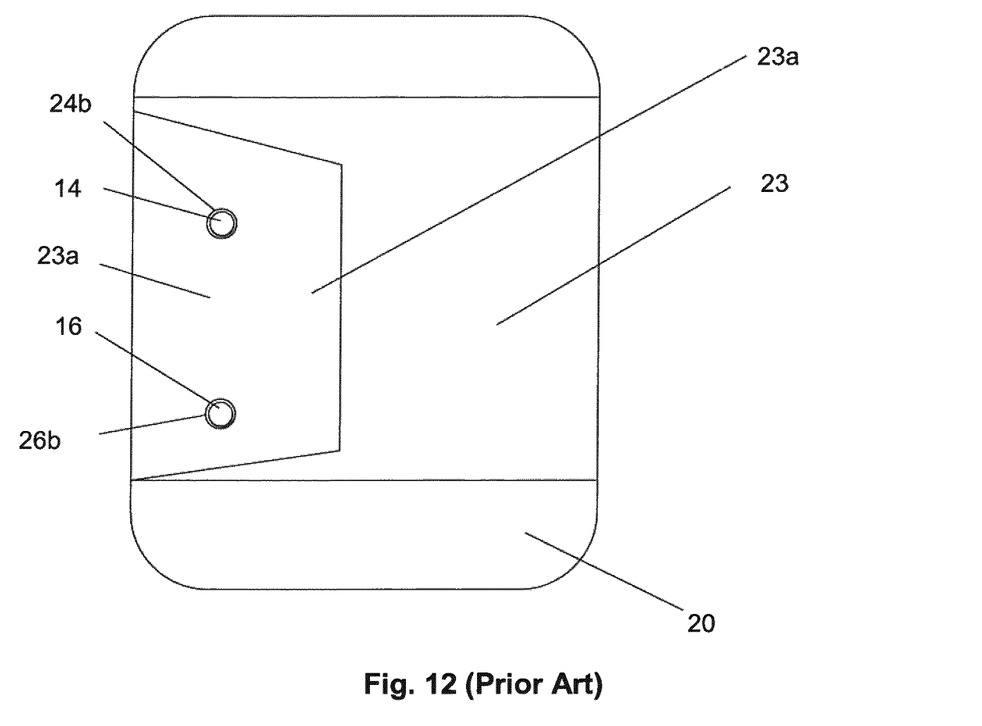

FIGS. 11 and 12 show a side airbag module according to the prior art in schematic representations. FIG. 11 is a cross sectional view basically taken along a horizontal plane (in the mounted state) and FIG. 12 is a side elevation from direction C of FIG. 11. This side airbag module 5 is comprised of an inflator unit 10, an airbag 21 and a wrapper 23. The inflator unit 10 is comprised of an inflator having a basically oblong cylindrical shape and two mounting studs 14, 16 extending from the generating surface of the inflator 12. The inflator 12 can be located completely inside the gas space 22 enclosed by the airbag 21, or one end of the inflator can extend through the airbag. This end usually shows a connector for the ignition cable. Each of the mounting studs 14, 16 extend through a hole in the airbag.

The major part of the airbag 21 is rolled and/or folded to an airbag package 20 which is located in front of the plane defined by the two mounting studs 14, 16. A wrapper 23 is provided which encircles a part of the airbag package 20. In the embodiment shown the height of this wrapper 23 is less than the height of the airbag package 20 (please see FIG. 12). This wrapper 23 is fastened to the two mounting studs 14, 16 so that the wrapper 23 has two holes for each mounting stud. In the drawings three of these four holes can be seen (reference numbers 24a, 24b and 26b). The wrapper has an overlapping part 23a in which the wrapper 23 is double-layered. At its forward end (forward relative to the vehicle when the side airbag module is mounted) the wrapper shows a breaking line 28, for example in form of perforation. This breaking line 28 allows the airbag to open the wrapper 23 when it is deployed due to inflation gas exhausted by the inflator 12.

Figure 13:
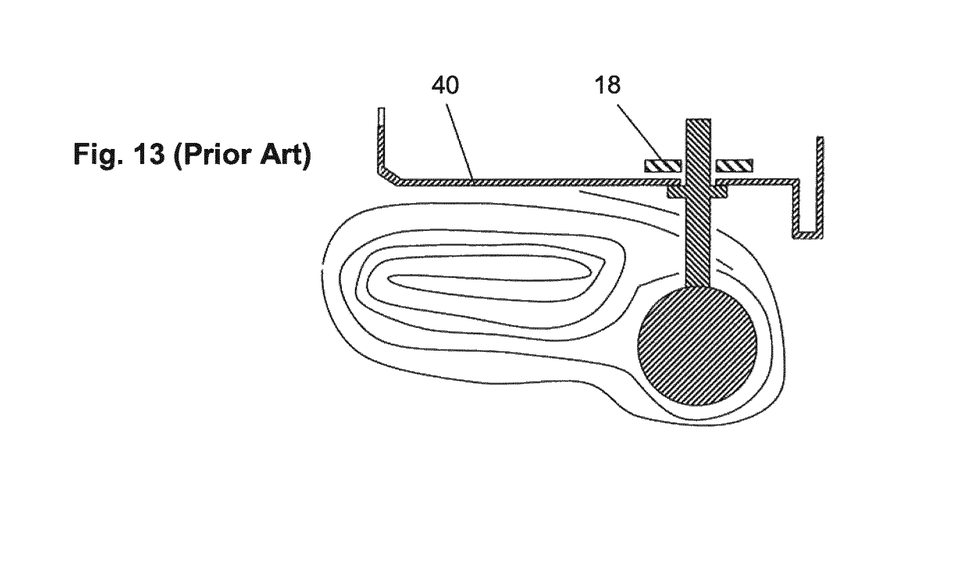

FIG. 13 shows the side airbag module 5 shown in FIGS. 11 and 12 mounted to a side section of a frame 40 a vehicle seat. The mounting studs 14, 16 extend through respective holes in the frame 40 and are secured to the same by the means of nuts 18.

Figure 14:
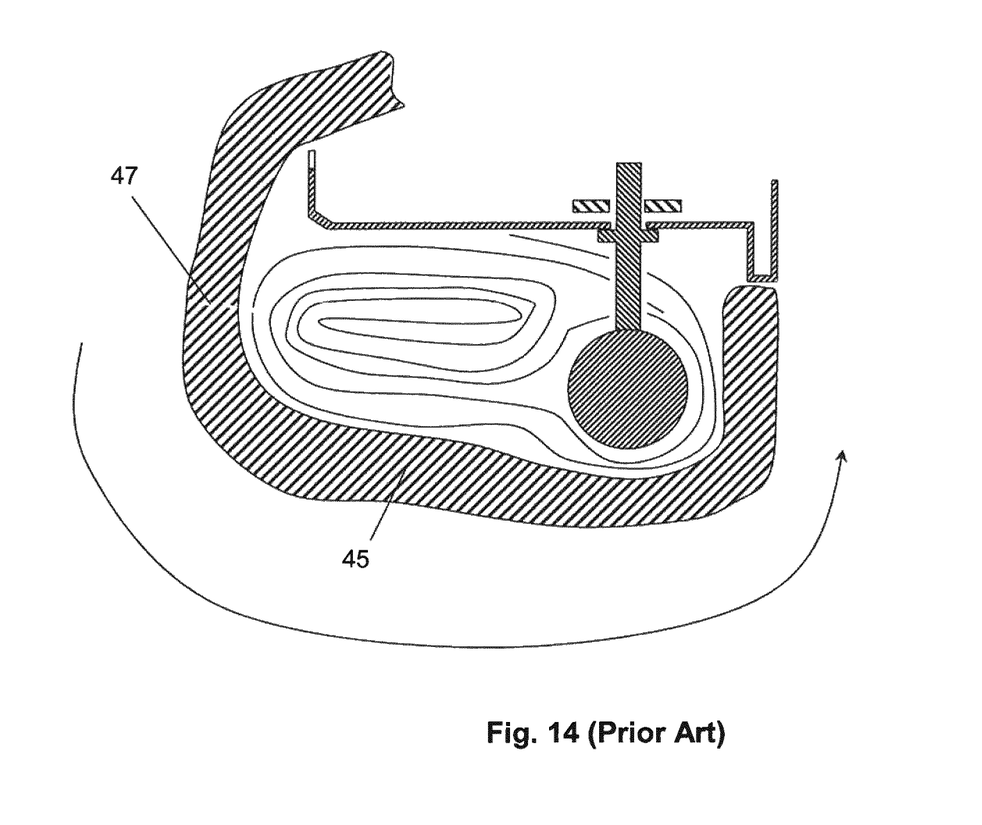

After the side airbag module 5 has been mounted to a frame 40 and upholstery 45 is pulled over the frame of the side airbag module 5 basically in the direction indicated by the arrow in FIG. 14. This upholstery shows a split line 47 which enables the airbag to deploy through this upholstery 45. A back panel can be provided on the rear side of the vehicle seat (not shown).

When mounting the upholstery 45 to the frame 40 care has to be taken in order to avoid that the pulling of the upholstery 45 over the airbag module 5 bends or tilts the airbag package 20 out of the position shown in FIG. 14. This substantially slows down the assembly process.

FIGS. 1 to 5 show the first embodiment of the invention. The side airbag module 5 is improved in such a way that a very reproducible positioning of the airbag package 20 relative to the frame can be achieved without the necessity of taking special care when applying the upholstery to the frame. According to the invention an additional flexible flap 30 is provided. This additional flexible flap 30 can for example be made of the same material as the wrapper 23. Especially it can be made of a woven plastic material. The wrapper-proximate end 30a of this additional flexible flap 30 is attached to the wrapper 23, for example by means of a connection seam 31. From there the additional flap extends to its wrapper-distal end 30b.

Figures 1, 2, 3, 3A:
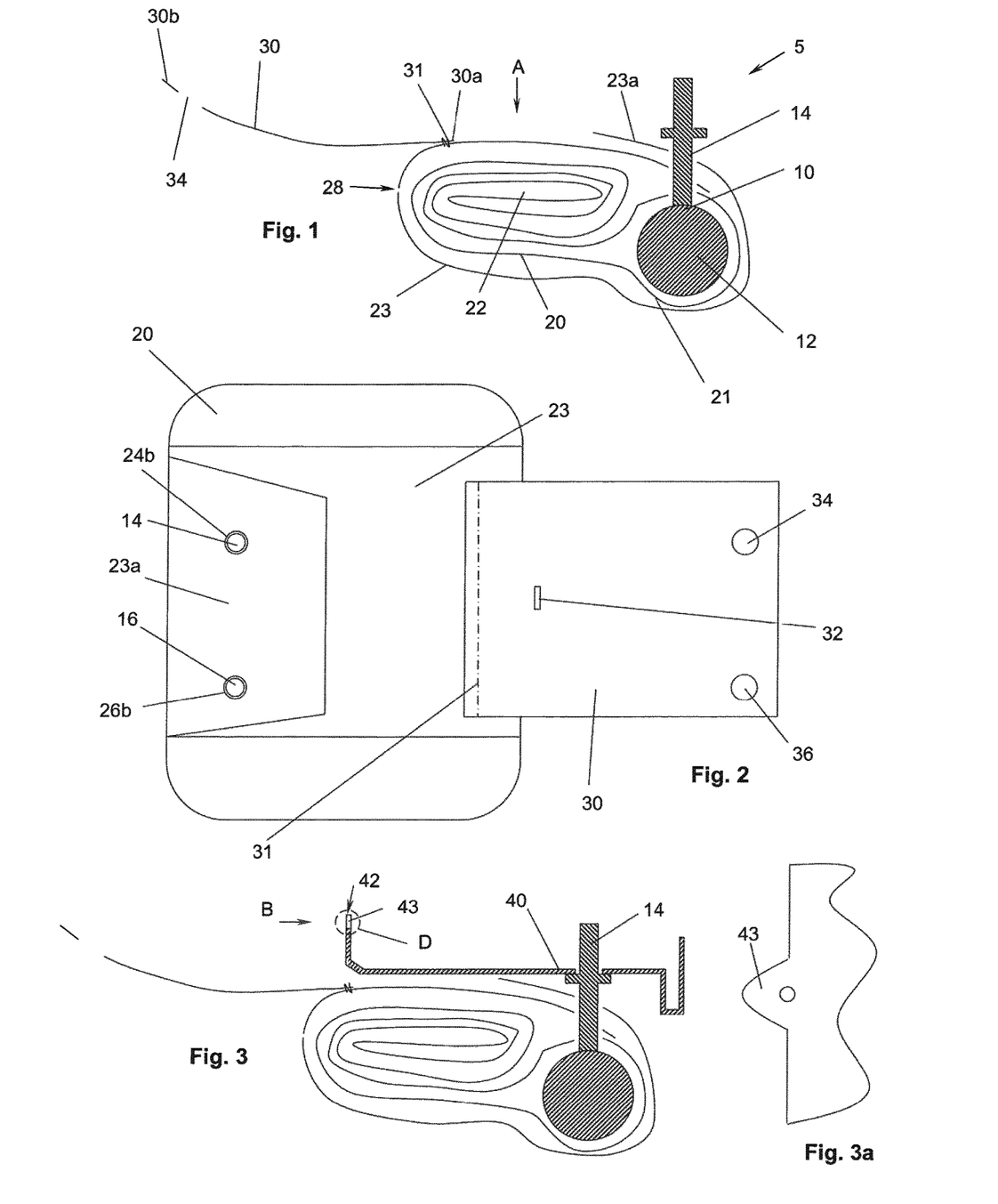

In the first embodiment this additional flexible flap 30 is attached to the wrapper 23 on the same side of the wrapper through which the mounting studs 14, 16 extend through the wrapper 23. The additional flexible flap 30 shows at least one connecting means for directly or indirectly connecting the flexible flap to the frame of the vehicle seat. In the first embodiment three connecting means are present, namely two holes 34, 36, each for being connected to a mounting stud 14, 16 and one slit-shaped hole 32 for being connected to a lug 43 of the frame. Even though three connecting means are present it is to be noted that at least in some applications only one connecting means could be sufficient.

The FIG. 3 shows the side airbag module 5 in a first mounting stage when mounted to the frame 40. One can see that the additional flexible flap 30 is not yet connected to the frame 40. From FIG. 3a one can see that the front edge 42 of the frame comprises a lug 43 facing away from the airbag module (to the inside).

Figure 4:
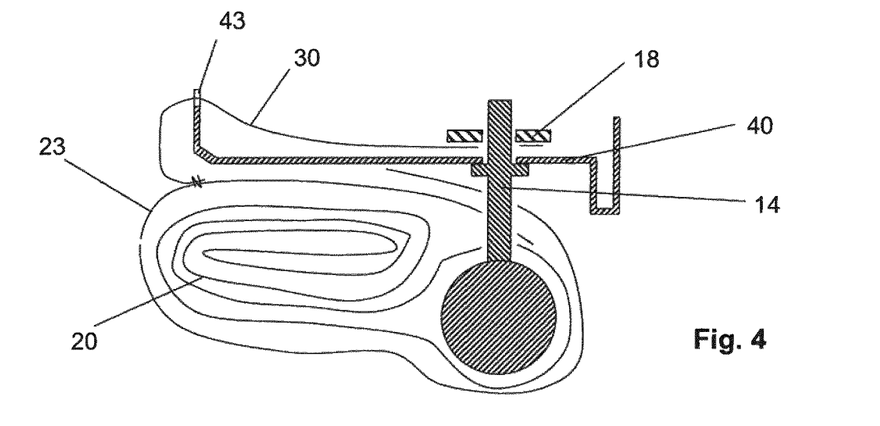

FIG. 4 shows what is shown in FIG. 3 after a subsequent step has been performed. The additional flexible flap 30 has been pulled around the front edge 42 of the frame 40 until the mounting studs 14, 16 extend through their respective holes 34, 36. In this state the lug 43 extends through the slit-shaped hole 32. Now the nuts 18 are screwed or riveted onto the mounting studs 14, 16. Here it needs to be noted that it is also possible to apply nuts to the mounting studs 14, 16 before the additional flexible flap 30 is pulled over the mounting studs 14, 16. Additional nuts can then be provided in order to secure the additional flap to the studs.

Figure 5:
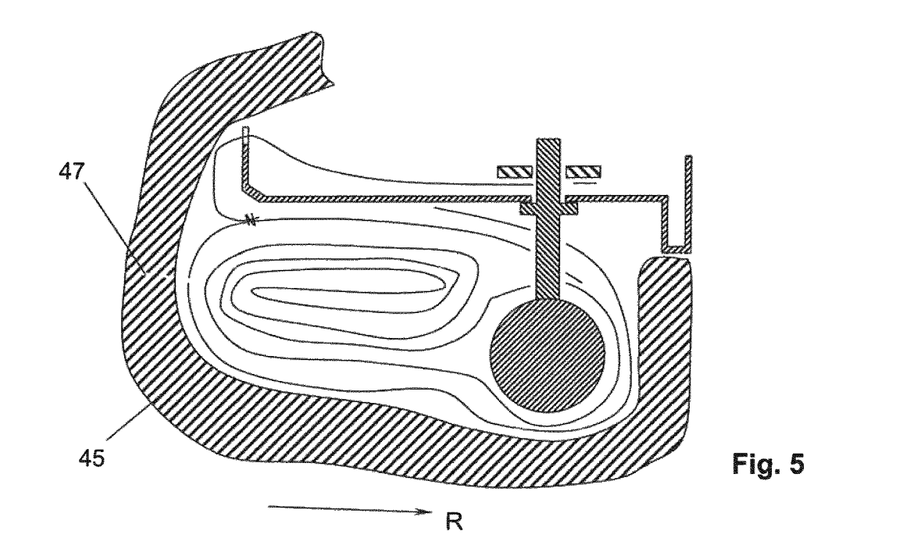

So the front end area of the wrapper 23 and thus the front end area of the airbag package 20 is fixed to the front end area of the frame 40. Consequently, the airbag package 20 is unable to move when the upholstery 45 is pulled over the same in the direction R (FIG. 5).

Figure 6:
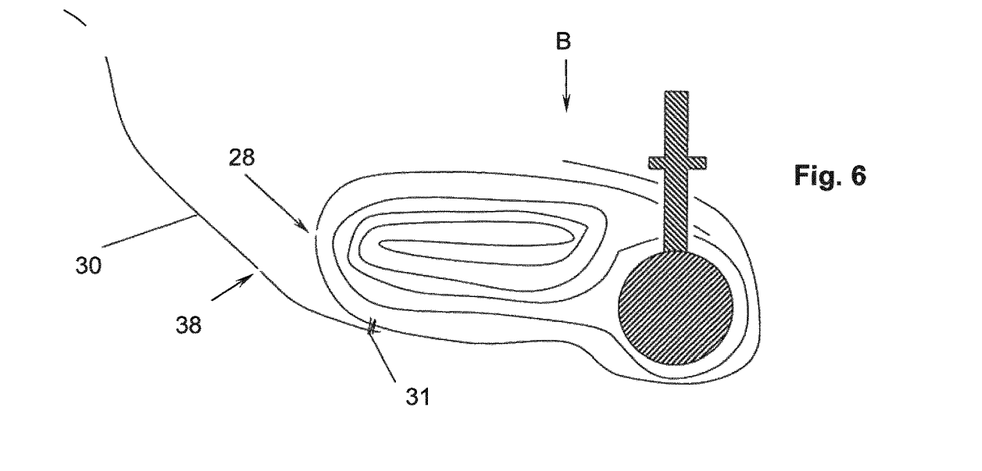
Figure 7:
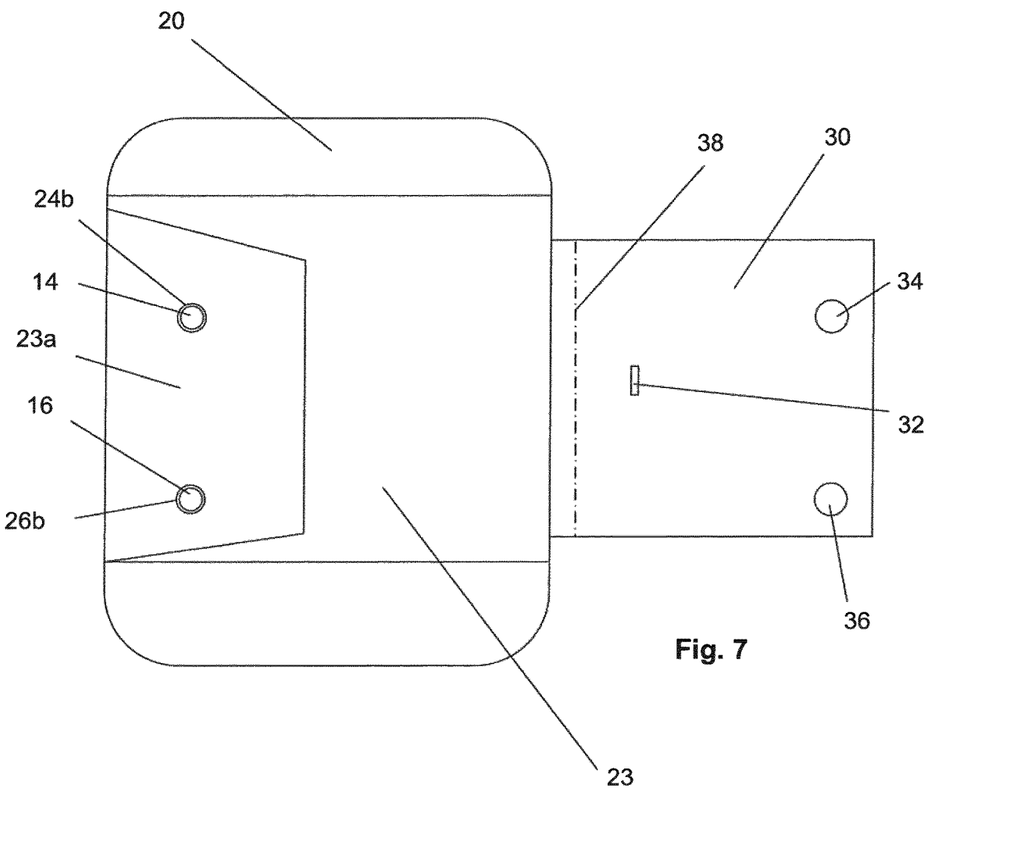
Figure 8:
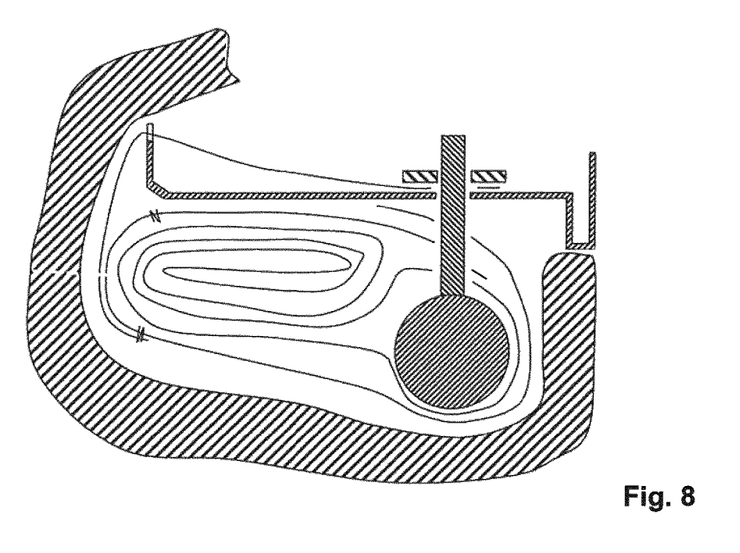

FIGS. 6 to 8 show a second embodiment. The difference to the first embodiment of the invention is that the additional flexible flap 30 is connected to the wrapper 23 on the other side, meaning basically opposite the side of the holes 24a, 24b, 26a, 26b for the mounting studs. Consequently the additional flexible flap 30 extends over the breaking line 28 of the wrapper 23 (see especially FIG. 8). So, the additional flexible flap 30 also shows a breaking line, namely the additional breaking line 38. It is preferred that this additional breaking line 38 basically aligns with the breaking line 28 of the wrapper 23. With the geometry of the second embodiment an even tighter position the airbag package 20 relative to the frame 40 can be achieved.

Figure 9:
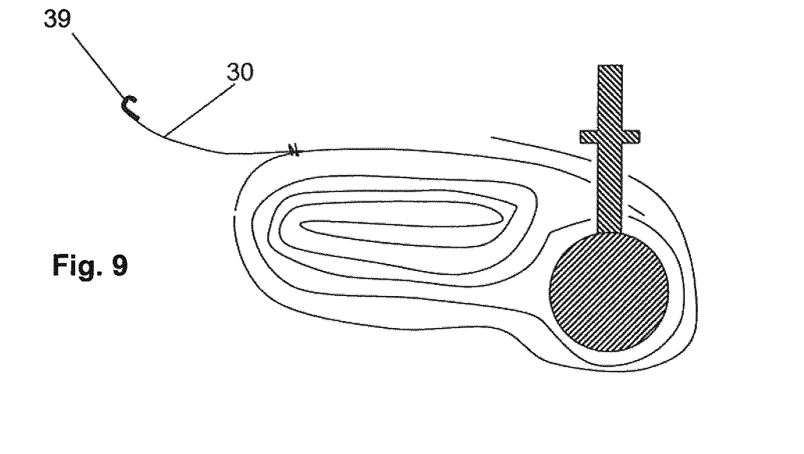
Figure 10:
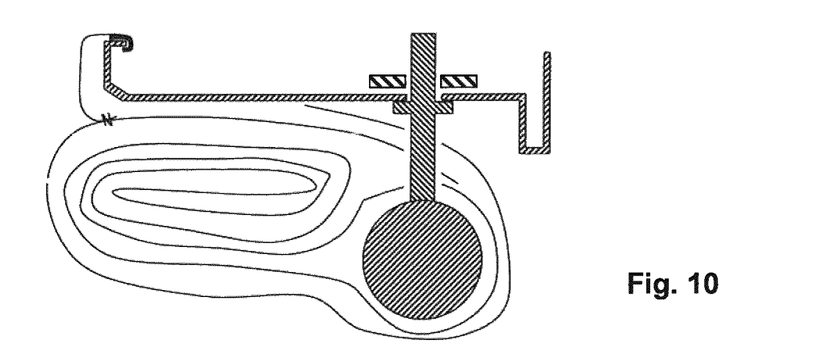

FIGS. 9 and 10 show a third embodiment of the invention. The difference is that another kind of connection means is used. Here the connection means is in form of a hook 39 which can be attached directly to the front edge 42 of the frame. One or more hooks 39 could be used. It goes without saying that this kind of mounting means could also be applied to the additional flexible flap 30 if the geometry of the second embodiment (FIGS. 6 to 8) is chosen.

In the embodiments shown the additional flexible flap 30 basically extends over the complete height of the wrapper 23. This might often be preferred but might not be necessary in all possible applications of the invention.

One sees that a very well defined position of the airbag package relative to the frame can be achieved by very simple means.

LIST OF REFERENCE NUMBERS 5 side airbag module
10 inflator unit
12 inflator
14, 16 mounting stud
18 nut
20 airbag package
21 airbag
22 gas space
23 wrapper
23a overlapping part
24a, b;
26a, b hole in wrapper for mounting stud
28 breaking line
30 additional flexible flap
30a wrapper-proximate end
30b wrapper-distal end
31 connection seam
32 slit-shaped hole
34, 36 hole for mounting stud
38 additional breaking line
39 hook
40 frame
42 front edge
43 lug
45 upholstery
47 split line

The invention claimed is:

1. A side airbag module comprising:
an inflator unit having an inflator and at least one mounting stud extending from the inflator,
an airbag defining a gas space being in fluid communication to the inflator, the airbag being at least partially rolled and/or folded to an airbag package,
a wrapper encircling a part of the airbag package, and
at least one additional flexible flap extending from the wrapper, the additional flexible flap having or carrying at least one connection means for connecting the at least one additional flexible flap to a vehicle seat frame at least indirectly, the at least one connection means includes one of a hole in the at least one additional flexible flap and a hook attached to the at least one additional flexible flap,
wherein the at least one additional flexible flap is located at an outside of the wrapper and the part of the airbag package encircled by the wrapper is located inside the wrapper,
wherein the airbag package and the wrapper encircling at least a part of the airbag package are mounted to a first side of the vehicle seat frame and the at least one additional flexible flap includes a first end attached to the wrapper and includes a second end attached to a second side of the vehicle seat frame, the second side of the vehicle seat frame being opposite to the first side of the vehicle seat frame,
wherein the wrapper has a breaking line in a front end area, and
wherein the at least one additional flexible flap extends over the breaking line of line wrapper and includes an additional breaking line in font of the breaking line of the wrapper.

2. The side airbag module of claim 1, wherein the at least one connection means includes the hole in the at least one additional flexible flap.

3. The side airbag module of claim 1, wherein the at least one connection means includes the hook attached to the at least one additional flexible flap.

4. A side airbag module comprising:
an inflator unit having an inflator and at least one mounting stud extending from the inflator,
an airbag defining a gas space being in fluid communication to the inflator, the airbag being at least partially rolled and/or folded to an airbag package,
a wrapper encircling a part of the airbag package, and
at least one additional flexible flap extending from the wrapper, the additional flexible flap having or carrying at least one connection means for connecting the at least one additional flexible flap to a vehicle seat frame at least indirectly, the at least one connection means includes one of a hole in the at least one additional flexible flap and a hook attached to the at least one additional flexible flap,
wherein the at least one additional flexible flap is located at an outside of the wrapper and the part of the airbag package encircled by the wrapper is located inside the wrapper,
wherein the airbag package and the wrapper encircling at least a part of the airbag package are mounted to a first side of the vehicle seat frame and the at least one additional flexible flap includes a first end attached to the wrapper and includes a second end attached to a second side of the vehicle seat frame, the second side of the vehicle seat frame being opposite to the first side of the vehicle seat frame, and
wherein the at least one additional flexible flap is sewn to the wrapper; wherein the wrapper has a breaking line in a front end area; wherein the at least one additional flexible flap extends over the breaking line of the wrapper and includes an additional breaking line in front of the breaking line of the wrapper.

5. The side airbag module of claim 4, wherein the at least one connection means includes the hole in the at least one additional flexible flap.

6. The side airbag module of claim 4, wherein the at least one connection means includes the hook attached to the at least one additional flexible flap.

* * * * *